US010792674B2

(12) United States Patent
Scharkowski et al.

(10) Patent No.: US 10,792,674 B2
(45) Date of Patent: Oct. 6, 2020

(54) PRECIPITATION TUBE BUNDLE FOR A WET ELECTROSTATIC FILTER AND WET ELECTROSTATIC PRECIPITATOR

(71) Applicants: STEULER KORROSIONSSCHUTZ HOLDING GMBH, Siershahn (DE); Jürgen Scharkowski, Mogendorf (DE); Matthias Herzog, Isenburg (DE)

(72) Inventors: Jürgen Scharkowski, Mogendorf (DE); Matthias Herzog, Isenburg (DE)

(73) Assignee: Steuler Korrosionsschutz Holding GmbH, Siershahn (DE)

(*) Notice: Subject to any disclaimer, the term of this patent is extended or adjusted under 35 U.S.C. 154(b) by 346 days.

(21) Appl. No.: 15/557,154

(22) PCT Filed: Mar. 11, 2016

(86) PCT No.: PCT/DE2016/100111
§ 371 (c)(1),
(2) Date: Sep. 11, 2017

(87) PCT Pub. No.: WO2016/146104
PCT Pub. Date: Sep. 22, 2016

(65) Prior Publication Data
US 2018/0043372 A1 Feb. 15, 2018

(30) Foreign Application Priority Data
Mar. 13, 2015 (DE) ........................ 10 2015 103 759

(51) Int. Cl.
*B03C 3/86* (2006.01)
*B03C 3/49* (2006.01)
(Continued)

(52) U.S. Cl.
CPC .................. *B03C 3/86* (2013.01); *B03C 3/06* (2013.01); *B03C 3/16* (2013.01); *B03C 3/49* (2013.01)

(58) Field of Classification Search
CPC combination set(s) only.
See application file for complete search history.

(56) References Cited

U.S. PATENT DOCUMENTS 1,634,372 A * 7/1927 Lewers ..................... B03C 3/41 96/92
3,144,881 A 8/1964 Sproull
(Continued)

FOREIGN PATENT DOCUMENTS

DE 4326189 A1 2/1995
DE 19747028 A1 4/1999
(Continued)

*Primary Examiner* — Amber R Orlando
*Assistant Examiner* — Sonji Turner
(74) *Attorney, Agent, or Firm* — Smartpat PLC

(57) ABSTRACT

A precipitation tube and a precipitation tube bundle for a wet electrostatic precipitator, in particular for separating dusts, gases, and/or aerosols from exhaust gases are disclosed. The precipitation tube is designed as a modular tube system. It has at least two wall parts which each form a periphery segment of an inner periphery of the precipitation tube and are connected to each other so as to form at least part of the inner circumference of the precipitation tube. The modular tube system may include at least two wall parts, which each form a length segment of the precipitation tube and are connected to each other so as to form at least part of the length of the precipitation tube. The precipitation tube bundle is modular and includes a supporting structure on which a plurality of precipitation tubes are detachably held by connecting elements.

12 Claims, 5 Drawing Sheets

Figure 1:
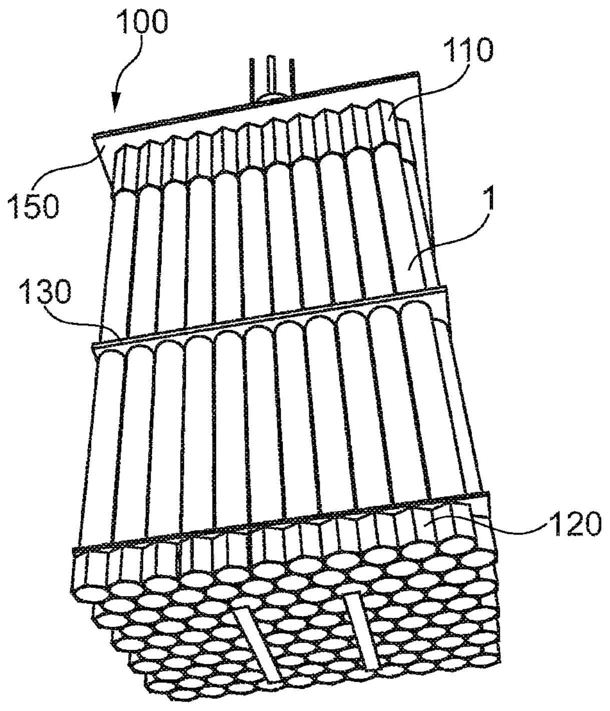

(51) Int. Cl.
*B03C 3/06* (2006.01)
*B03C 3/16* (2006.01)

(56) References Cited

U.S. PATENT DOCUMENTS

| | | | | | |
|---|---|---|---|---|---|
| 3,636,985 | A | | 1/1972 | Burchett | |
| 4,102,038 | A | * | 7/1978 | Eagan | B03C 3/86 29/462 |
| 4,105,562 | A | * | 8/1978 | Kaplan | B01D 29/15 210/232 |
| 6,247,500 | B1 | | 6/2001 | McMahon | |
| 6,375,698 | B1 | * | 4/2002 | Clements | B01D 46/0021 55/341.1 |
| 6,599,349 | B1 | * | 7/2003 | Scharkowski | B03C 3/16 55/360 |
| 6,858,064 | B2 | * | 2/2005 | Bologa | B03C 3/16 55/DIG. 38 |
| 7,438,743 | B2 | * | 10/2008 | Strauss | B03C 3/86 55/DIG. 38 |
| 7,682,427 | B2 | * | 3/2010 | Bologa | B03C 3/16 55/DIG. 38 |
| 7,927,392 | B2 | * | 4/2011 | Clements | B01D 46/0021 55/341.1 |
| 2011/0259462 | A1 | | 10/2011 | Gaigler et al. | |

FOREIGN PATENT DOCUMENTS

| | | | | | |
|---|---|---|---|---|---|
| DE | 19833226 | C1 | | 4/2000 | |
| DE | 101 53 236 | C1 | * | 2/2003 | |
| DE | 10227689 | A1 | | 1/2004 | |
| DE | 102004023967 | B3 | | 12/2005 | |
| DE | 102005007011 | A1 | | 8/2006 | |
| DE | 102007031702 | A1 | * | 1/2009 | B03C 3/06 |
| DE | 102007031702 | A1 | | 1/2009 | |
| EP | 0160890 | A2 | | 4/1985 | |
| EP | 0405169 | A2 | | 5/1990 | |
| GB | 122534 | A | | 1/1919 | |

* cited by examiner

PRECIPITATION TUBE BUNDLE FOR A WET ELECTROSTATIC FILTER AND WET ELECTROSTATIC PRECIPITATOR

The invention relates to a precipitation tube bundle for a wet electrostatic filter and a wet electrostatic filter.

Wet electrostatic filters are technical systems for cleaning exhaust air, exhaust gas, or process gases (referred to below in general as exhaust gas) and for precipitating solid or liquid particles. To this end, wet electrostatic filters use the force generated by an electric field on charged particles, which are deposited on a collector electrode and removed from there by rinsing or freely dropping, for example due to the effect of gravity.

Wet electrostatic filters typically comprise a plurality of precipitation tube through which the exhaust gas to be cleaned is fed. An electric field is generated such that when the exhaust gas flows through the precipitation tubes, the particles present in the exhaust gas are ionized and wander to the inner wall of the precipitation tube due to the force effect of the electric field. There the ionized particles are transported outward, together with liquid droplets from the exhaust gas flowing along the inner wall of the precipitation tubes.

The precipitation tubes are typically collated as a bundle, and as a bundle form a solid structural unit produced at the factory. Such a precipitation tube bundle is known from DE 198 33 226 CI, for example. The precipitation tube bundle comprises a top support collar acting as a support structure for the precipitation tube and being welded to the precipitation tubes. In addition, a middle guide ring and a bottom guide ring are placed over the precipitation tubes, by means of which the precipitation tubes are held at a fixed spacing apart from each other. Said guide rings are also welded to the precipitation tubes.

Due to the plurality of precipitation tubes collated in one precipitation tube bundle, relatively large bundle cross sections are often achieved. In many cases, the dimensions reached are so great that expensive special transportation is required for transporting the precipitation tube bundle from the factory to the construction site. The precipitation tube bundle can also frequently be sufficiently packed only if relatively expensive special packaging is used.

One embodiment of the invention has the object of proposing at least one potential for reducing the transport effort for precipitation tube bundles of the type indicated above.

Said object is achieved by means of a precipitation tube comprising the features of claim 1. The object is further achieved by means of a wall part having the features of claim 13, a precipitation tube bundle having the features of claim 15, and a precipitation tube bundle having the features of claim 16. The object of the invention is further achieved by a proposed method for producing a precipitation tube bundle having the features of claim 23 and a wet electrostatic filter having the features of claim 25. Advantageous embodiments of the invention result from the subclaims, the description below, and the figures.

For achieving the object, one concept of the invention is to subdivide a wet electrostatic filter into individual modules according to the building block principle. These modules are preferably volumetrically dimensioned so as to be a standardized size for transport. This results in advantages in freight costs, as expensive special transport can be avoided.

According to one embodiment of the invention, a precipitation tube for a wet electrostatic filter, particularly for precipitating solid and/or gaseous particles, such as for precipitating dusts, gases, and/or aerosols from exhaust gases. A precipitation tube is understood to be an elongated hollow body of any arbitrary type and/or embodiment, the hollow space or hollow spaces there forming a passage for exhaust gases and performing or being able to perform the function of a precipitation tube of a wet electrostatic filter.

The precipitation tube is characterized by being implemented as a modular tube system. The precipitation tube or precipitation tube system can thereby be broken down into components thereof and transported. A compressing of the volume and/or the transport units is thereby achieved. The transport is thereby less expensive and less risky. The lower volume or smaller transport units also result in transport advantages. The modular tube system is particularly understood to mean the entirety of the components implementing the precipitation tube, said components forming the precipitation tube as modules.

The precipitation tube is characterized in the modular construction thereof, particularly by comprising at least two wall parts, particularly separate wall parts, each forming one periphery segment of the inner circumference of the precipitation tube and connectable and connected to each other, forming at least one part of the inner circumference of the precipitation tube. A measure is thereby taken by means of which the precipitation tube is at least partially dismantled circumferentially before assembly of the wall parts occurs. In this manner, a high level of compression in volume can be achieved, as it is preferred that the wall parts can be stacked on top of each other for transport or packaging purposes.

In addition or alternatively, the precipitation tube is characterized in the modular construction thereof, particularly by comprising at least two wall parts, particularly separate wall parts, each forming one longitudinal segment of the precipitation tube and connectable and connected to each other, particularly axially or in the axial direction, forming at least one part of the length of the precipitation tube. The wall parts can be the wall parts described above or other or additional wall parts. A measure is thereby taken by means of which the precipitation tube is at least partially dismantled in the length thereof before assembly of the wall parts occurs. In this manner, the precipitation tube can be conceived modularly such that the wall parts are sized in small transport units for transporting in small transport units for the transport of the precipitation tube, so that expensive special transport due to excess length, for example, can be avoided.

Stacking of the individual components of the precipitation tube or precipitation tube system is achieved in a simple manner and at a high rate of volumetric compression, when the precipitation tube is divided longitudinally by the wall parts according to one embodiment of the invention. The wall parts are then longitudinal parts of the precipitation tube or precipitation tube system. In addition or alternatively, the precipitation tube can be divided transversely by the wall parts.

According to a further embodiment of the invention, the wall parts are implemented as identical parts. The precipitation tube or precipitation tube system can thereby be implemented in an inexpensive manner, because identical wall parts can be used for assembling the modular precipitation tube system and therefore only one type of wall part needs to be manufactured. Another result is that assembling the precipitation tube becomes easier, as the assembler does not need to select among different components.

The at least two wall parts forming a periphery segment of the inner circumference of the precipitation tube and/or the at least two wall parts forming a longitudinal segment of the precipitation tube, particularly mutually adjacent wall parts, can be cohesively connected to each other. For example, the wall parts are connected to each other by welding, particularly by using thermal energy and/or mechanical energy. For example, the wall parts are connected to each other by friction welding, heating element butt-welding, and/or fusion welding. The wall parts can thereby be produced technically simply and at low cost. Any connecting means for connecting the wall parts to each other may optionally be eliminated, for example in that the wall parts are welded to each other without additional welding material, particularly butt welded to each other.

According to a further embodiment of the invention, the at least two wall parts forming a periphery segment of the inner circumference of the precipitation tube, can be or are connected to each other by means of connecting means, particularly removably connected, for example connected by force fit or by form fit, forming at least one part of the inner circumference of the precipitation tube.

According to a further embodiment of the invention, the at least two wall parts forming a longitudinal segment of the precipitation tube, can be or are connected to each other by means of connecting means, particularly removably connected, for example connected by force fit or by form fit, forming at least one part of the length of the precipitation tube. The connecting means can be the connecting means described above, or other or further connecting means.

It is thereby possible, in a simple manner for technical assembly, to produce the wall parts in the factory and to have the wall parts assembled by an installer to form the precipitation tube at the customer's site. Replacement of individual wall parts can also be performed in a simple manner for technical assembly when the precipitation tube has already been assembled, because the components of said tube can be designed for disassembly.

For example, the connecting means for such wall parts are made of or comprise a non-weldable plastic. The non-weldable plastic is, for example, a Teflon material or a high-molecular-weight plastic. Such materials can be used by the connecting means in the modular concept that remain unconsidered when connecting the wall parts by means of welding.

It is fundamentally also possible that the wall parts are joined by means of the connecting means, particularly adjacent wall parts joined to each other, are or can be non-releasably connected to each other. Such a non-releasable connection can be implemented by an adhesive connection, such as welding, soldering, and/or gluing the wall parts to each other.

It is possible that the connecting means are implemented on the wall parts, particularly formed in place. The connecting means can thereby be implemented in a technically simple manner, as said means are already produced during the producing of the wall parts. The assembling of the wall parts is also made easier thereby, as the assembler has the connecting means available directly on the wall parts and thus does not need to use separate connecting means.

Alternatively, the connecting means can be formed by at least one separate connecting element or comprise one such separate connecting element. The wall parts or two adjacent wall parts can then be connected by interposing the connecting element. To this end, the connecting element can comprise one joining site for the one wall part and a further joining site for the other wall part.

According to one potential embodiment of the invention, the connecting means are implemented as form-fit means holding the wall parts together positively in the radial direction of the precipitation tube and/or in the axial direction of the precipitation tube. A stable and durable connection is thereby implemented in a technically simple manner.

For example, the connecting means can comprise or be made of at least one tongue-and-groove arrangement along opposite edges of the wall parts or end regions of the wall parts and engaging or being able to engage with each other. A plug connection is thereby implemented at the edges or end regions of the wall parts opposite each other. The wall parts are, for example, a type of butt connection at the butt joint or at the end faces facing each other and butted together, wherein the plug connection is present at the ends of the wall parts in the circumferential direction of the precipitation tube and/or in the longitudinal direction of the precipitation tube due to the tongue-and-groove arrangements or tongue-and-groove arrangement.

Such an embodiment of the connecting means can be produced at any arbitrary location, such as at the customer site, by an assembler in a simple manner and without extensive tools. The assembly of the wall parts and thus the assembly of the precipitation tube can be performed in an easily handled manner.

The tongue-and-groove arrangement comprises at least one groove or groove element of arbitrary design, implemented as a recess, particularly an elongated recess. The groove or groove element can be formed by a material step, for example. It is critical that the groove or groove element has such a shape so as to engage with a corresponding tongue element of the tongue-and-groove connection and to achieve the desired form-fit effect.

The tongue element of the tongue-and-groove arrangement can also have an arbitrary shape. It is critical that the tongue element is implemented in the manner of a protrusion or as a protrusion able to engage in the groove or against the groove for forming the desired form-fit effect.

In order achieve a stable and durable connection of the wall parts, particularly adjacent wall parts, to each other, the connecting means should extend largely, particularly substantially continuously, in the direction of the axial extent of the precipitation tube when the wall parts each form on periphery segment of the inner circumference of the precipitation tube. For example, the connecting means are at least partially part of a profile extending in the axial direction of the precipitation tube, or at least partially form such a profile.

The same direction is intended by the measure that the connecting means extend largely, particularly substantially continuously, along the circumference of the precipitation tube, when the wall parts each form a longitudinal segment of the precipitation tube. For example, the connecting means are at least partially part of a profile extending in the circumferential direction of the precipitation tube, or at least partially form such a profile.

According to a further embodiment of the invention, retainers are provided, by means of which the wall parts connected to each other are secured against undesired release from each other at least in one direction. For example, the retainers comprise a material segment on one of the wall parts, particularly one of the wall parts each, wherein the material segment overlaps the one wall part in the circumferential direction and/or in the longitudinal direction along one end and a catch protrusion thereof engages or can engage in a recess on the external circumference of the other wall part. The retainer is thereby implemented in a technically simple manner.

It is advantageous if the material segment is formed on the associated wall part in each case. The retainer is thereby implemented in a simple manner for manufacturing and is secured against loss. Simple handling during assembly is also thereby made possible, as the assembler has the retainers present directly at the wall parts.

It is further advantageous that the material segment is implemented as a longitudinal profile extending in the axial direction relative to the precipitation tube. The retainer thereby acts over a wide region along the connection of adjacent wall parts extending in the axial direction relative to the precipitation tube.

It is advantageous that the precipitation tube is a plastic tube. For example, according to an embodiment of the invention, the wall parts are implemented as plastic parts, for example comprising plastic or made of plastic. The wall parts can thereby be implemented at low cost and light in weight. For example, the wall parts are extrusion parts produced by means of an extrusion method. In addition, the precipitation tube is thereby particularly suited for the passage of corrosive exhaust gases. It has been determined that the group of plastics associated with polyolefins, such as polypropylene and/or polyethylene, are advantageous, because said plastics have relatively high heat resistance and sufficient strength.

The wall parts can also comprise a conductive coating on the wall segment thereof forming the inner circumference of the precipitation tube, for example comprising graphite or made of graphite. The parts having such a coating are coextrusion parts, for example, produced by coextruding. According to the invention, such coated wall parts are also comprised by the precipitation tube implemented as a plastic tube.

It is fundamentally also possible that the wall parts are implemented as metal parts, for example comprising metal material or made of metal. Highly temperature-resistant precipitation tubes can thereby be implemented, for example.

According to a further embodiment of the invention, at least three wall parts are provided, each forming one periphery segment of the inner circumference of the precipitation tube, of which adjacent walls parts are connected to each other for implementing at least one part of the inner circumference of the precipitation tube, for example by means of the connecting means. The precipitation tube is thereby designed in the modular construction thereof, such that the individual wall parts can be stored at a high packing density.

The invention further relates to a wall part for a precipitation tube of a wet electrostatic filter having the features of one of the wall parts of the precipitation tube described above or of a precipitation tube of the type described above. The wall part forms a periphery segment of the inner circumference of the precipitation tube and can be connected to at least one further wall part for implementing at least one part of the inner circumference of the precipitation tube. In addition or alternatively, the wall part forms a longitudinal segment of the precipitation tube and can be connected to at least one further wall part for implementing at least one part of the length of the precipitation tube.

The invention further relates to a precipitation tube bundle for a wet electrostatic filter, particularly for precipitating dusts, gases, and/or aerosols from exhaust gases, having a plurality of precipitation tubes of the type described above.

The invention further comprises a precipitation tube for a wet electrostatic filter, particularly for precipitating dusts, gases, and/or aerosols from exhaust gases, implemented as a modular tube bundle system and to this end comprising a plurality of precipitation tubes and a support structure consolidating the precipitation tubes as a bundle, on which the precipitation tubes are releasably retained by means of connecting means. The precipitation tubes can be directly or indirectly releasably held on the support structure by means of a separate component by means of the connecting means. At least some individual precipitation tubes can be formed by the modular precipitation tubes described above.

The modular construction enables the precipitation tube bundle to be disassembled into the components thereof and transported. The freight to be transported then takes up considerably less volume than transport of the entire unit. The transport costs are thereby reduced, because expensive special transportation is avoided that would otherwise be necessary due to exceeding the load dimensions.

Because the precipitation tubes are removably mounted on the support structure, assembly of the components of the precipitation tube is possible at any arbitrary destination location, such as on site at the construction site, and is made easier by the connection means provided to this end. It is also thereby possible for individual components of the precipitation tube bundle, such as individual precipitation tubes, to be easily replaced, for example during maintenance work.

According to one embodiment of the invention, the connecting means are implemented as form-fit means. Assembly of the tube bundle system is thereby possible at any arbitrary location in a simple manner, for example at the customer's site or the construction site. For example, due to the form-fit means at least one of the precipitation tubes is positively retained in the axial direction relative to the precipitation tube. The precipitation tube is thereby attached to the support structure in a stable and robust manner at least in the axial direction, so that the precipitation tube can be installed in a suspended arrangement in the wet electrostatic filter by implication by means of the support structure.

It is advantageous that the connecting means comprise at least one connecting element and at least one counterpart element, wherein the connecting element is formed or preassembled on the associated precipitation tube and/or the counterpart element on the support structure. The precipitation tube bundle can thereby be easily assembled at the construction site by an assembler, because at least one part of the connection means is already present on the precipitation tube or the support structure.

The support structure can comprise at least one, preferably a plurality of plug-in receptacles in which preferably at least one of the precipitation tubes is or can be introduced or inserted, wherein the at least one precipitation tube is firmly retained in the axial direction on the support structure by the connecting means.

The precipitation tube is retained or attached in the axial direction on the support structure in a simple manner, if according to a further embodiment of the invention the connecting means form or comprise a bayonet joint. The bayonet joint can be formed by or comprise a joint groove or joint channel running in the direction of introduction of the precipitation tube and a latching groove or latching channel running transverse thereto on the support structure and a protrusion of the associated precipitation tube inserted therein. When the protrusion is introduced into the joint groove or the joint channel, the precipitation tube is brought into a fixed rotational orientation relative to the support structure. When the protrusion is then displaced from the joint groove or joint channel into the latching groove or latching channel, in that, for example, the precipitation tube is rotated relative to the support structure by a particular or prescribed angle, the precipitation tube is locked against axial displacement of the precipitation tube relative to the support structure.

The protrusion can be formed on the precipitation tube. The protrusion can also be connected to the precipitation tube, for example in that the protrusion is threaded into the precipitation tube. The protrusion can be implemented as a catch, a bump, or similar latching element.

It is advantageous that the latching groove or the latching channel has a longitudinal segment forming the end position for the protrusion, wherein the cross section of the latching groove or the latching channel tapers down in the longitudinal direction thereof, at least into the region of the longitudinal segment. Clearance between the assembled precipitation tube relative to the support structure is thereby adjustable in the axial direction, in that the precipitation tube is brought into a corresponding rotational orientation relative to the support structure, so that the protrusion is present in a position in the latching groove or latching channel bringing about the desired axial clearance.

The joint groove or joint channel and the latching groove or latching channel can be implemented directly in the support structure. The joint groove or joint channel and the latching groove or latching channel can also be implemented on the separate component or on a separate component, for example for connecting or connected to the support structure, particularly fixedly connected. For example, the plug-in receptacles or further plug-in receptacles in addition to the plug-in receptacles on the support structure are implemented on the separate component for precipitation tubes. For a precipitation tube bundle implemented for vertical erection, the separate component can be disposed below the support structure.

An improvement in stability of the connection between the precipitation tubes and the support structure is achieved if, according to a further embodiment of the invention, the grooves or channels and the associated protrusions of each precipitation tube and the associated plug-in receptacles are provided in pairs in the support structure.

It is advantageous that the support structure is at least in two parts or in a plurality of parts, wherein the parts of the support structure are divided transverse to at least some of the plug-in receptacles. The support structure is thereby itself also modular in construction, thereby enabling space-saving storage for transport in the disassembled state as individual components of the support structure. The parts or components of the support structure can be removably connected to each other by means of screw elements, for example, so that assembly of the support structure can be performed easily by an assembler.

The support structure and the plug-in receptacles thereof can be implemented as a honeycomb. The honeycomb form provides a stabile composite structure despite the plurality of pass-through openings forming the plug-in receptacles. For example, the parts of the support structure form half-honeycombs, for example identical to each other.

The support structure can be implemented as a plastic part and/or as an injection molded part, and if the support structure comprises at least two components, the components or parts of the support structure can be made of plastic or comprise plastic, particularly can be implemented as injection molded parts. The support structure and at least one of the precipitation tubes are made of the same material or comprise the same material, for example.

According to a further embodiment of the invention, at least one guide part, particularly a guide ring, is provided for maintaining spacing of the precipitation tubes and is removably connected to the precipitation tubes. It is thereby ensured that the precipitation tubes remain permanently in the defined position relative to each other over the length thereof. It is further advantageous that the at least one guide part is connected to the precipitation tubes spaced apart from the support structure.

For example, the support structure is disposed in the region of the top end of the precipitation tubes and the guide part is disposed in the region of the bottom end of the precipitation tubes. At least one further guide part, particularly a guide ring, can also be provided, for example disposed between the guide part at the bottom and the support structure at the top, for example in the middle region of the precipitation tubes.

According to a further embodiment of the invention, the precipitation tube bundle comprises a grounding device. The grounding device can be prefabricated as a unit and assembled to the precipitation tube bundle at the corresponding location during assembling of the wet electrostatic filter.

The invention further relates to a method for producing a precipitation tube of the type described above. The method is characterized in that the wall parts of the precipitation tubes and the support structure are transported to a destination location, for example to the site of installation of the wet electrostatic filter, and connected to each other there. Such a method for producing is made possible by the modular construction of the tube bundle system. Assembling at the arbitrary location in turn produces the prerequisite that transport of the individual components of the wet electrostatic filter to the construction site can occur. A smaller volume of freight is thereby required than would be the case for transporting the precipitation tube bundle as a whole. Due to the method and the modular construction of the precipitation tube bundle, producing the wet electrostatic filter at low cost is achieved.

It is similarly advantageous that according to a refinement of the invention at least one of the precipitation tubes is first assembled from the wall parts at the destination location. The wall parts of each precipitation tube and the support structure can be prefabricated or preconditioned at the factory.

It can be further provided that a guide part for spacing apart the precipitation tubes is assembled to the precipitation tubes at the location.

According to the invention, low-cost transport of precipitation tubes for wet electrostatic filters is achieved. Transport and storage in containers is also made possible, whereby the transport has a high degree of safety.

According to the invention, a completely customized preproduction of the load-bearing components of a wet electrostatic filter, particularly a precipitation tube bundle including a grounding device for the precipitation tube bundle, can already be performed at the factory. The assembly of the wet electrostatic filter can be performed on site at the construction site or at the customer's facility. The assembly as such can be performed easily, because the assembly of the components takes place using plug connections and screw connections, for example. Technical personnel can thus be saved.

Additional objectives, advantages, features, and potential applications of the present invention result from the below description of a plurality of embodiment examples, using the drawing. All described and/or illustrated features themselves, or in arbitrary sensible combination, form the object of the present invention, including regardless of the summary thereof in the claims or the references thereof.

Figure 2:
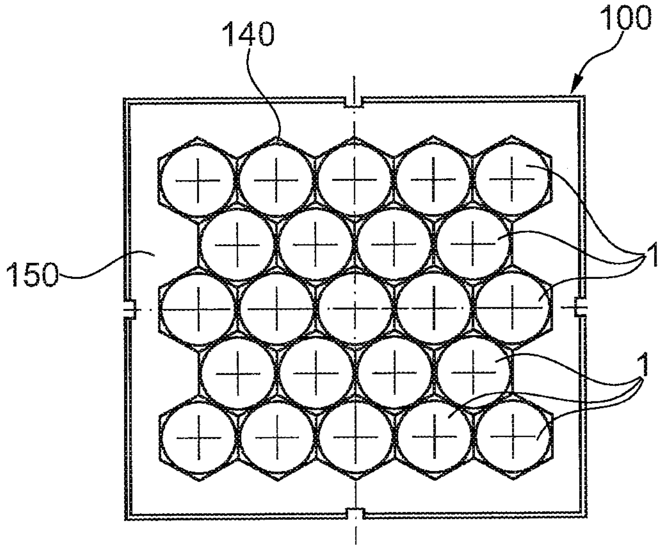
Figure 3:
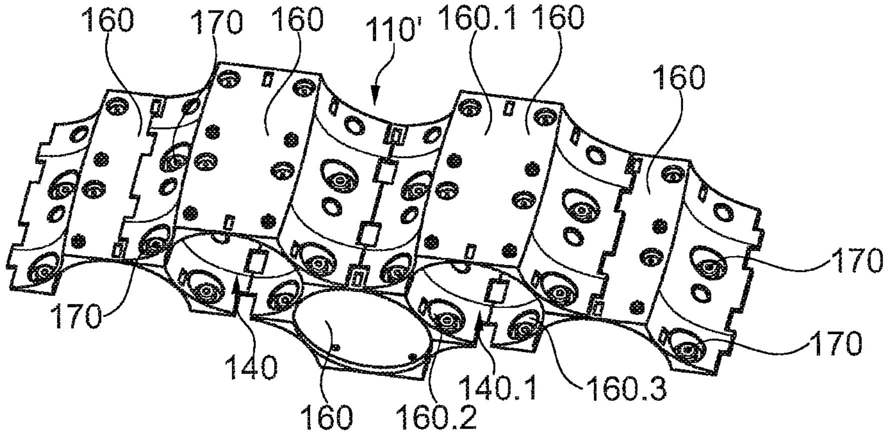
Figure 4:
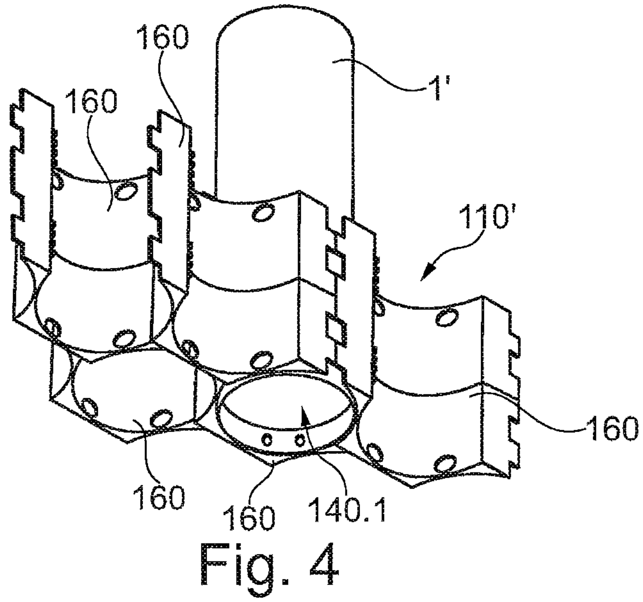
Figure 5:
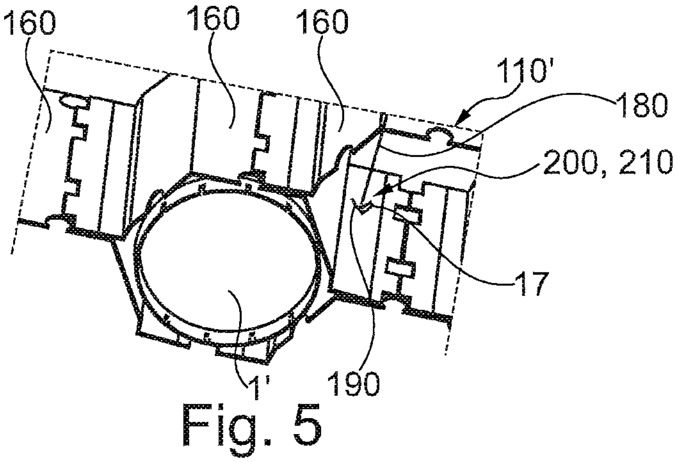
Figure 6:
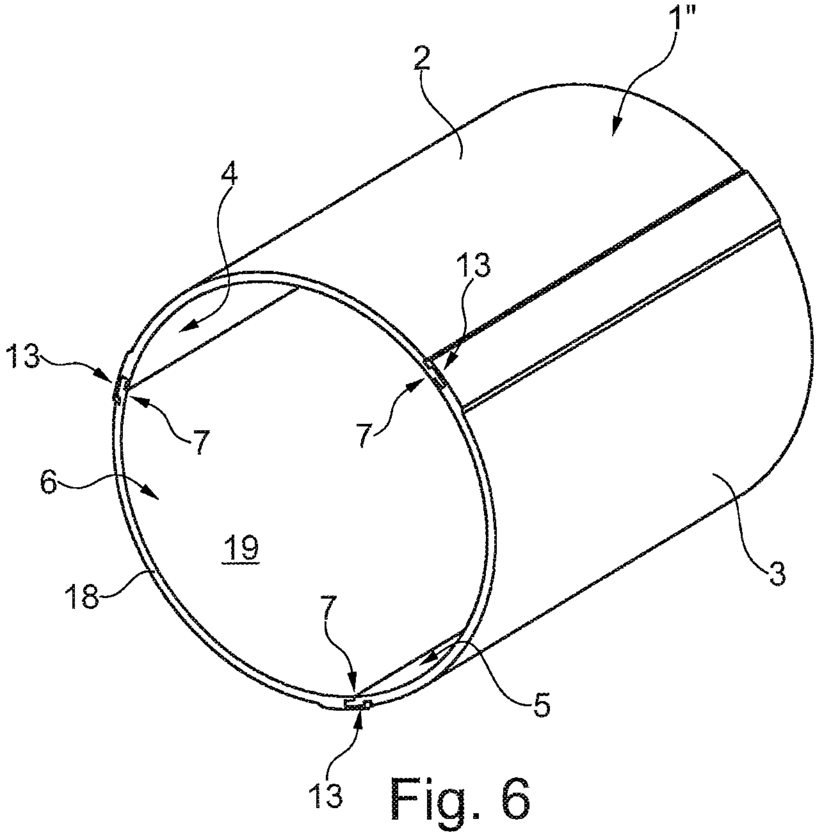
Figure 7:
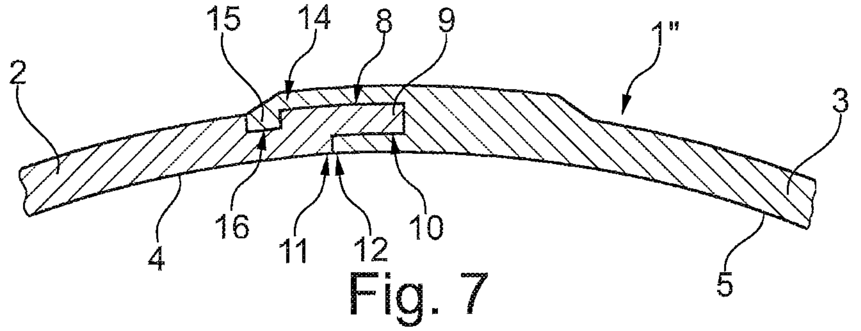
Figure 8:
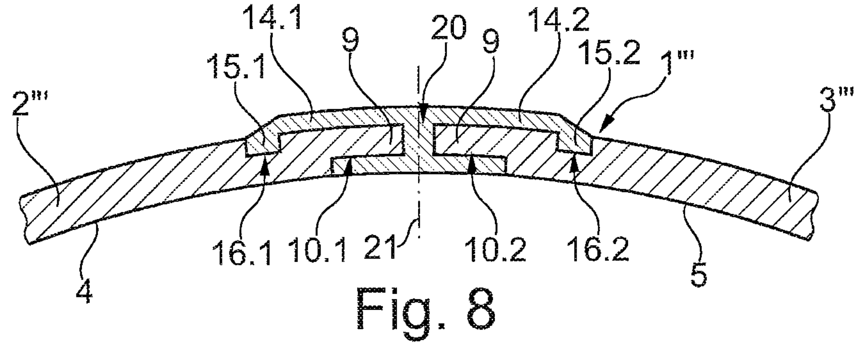
Figure 9:
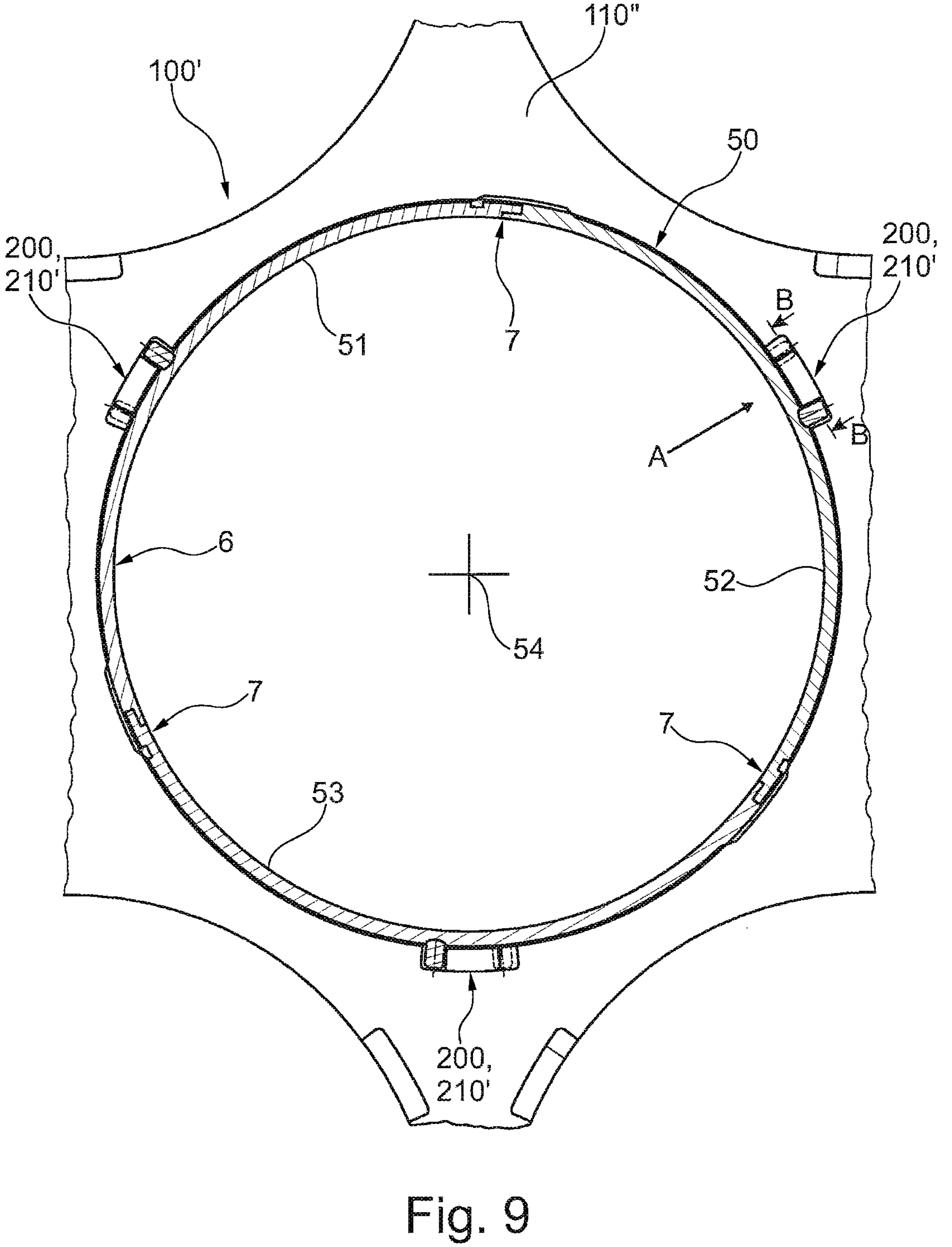
Figure 10:
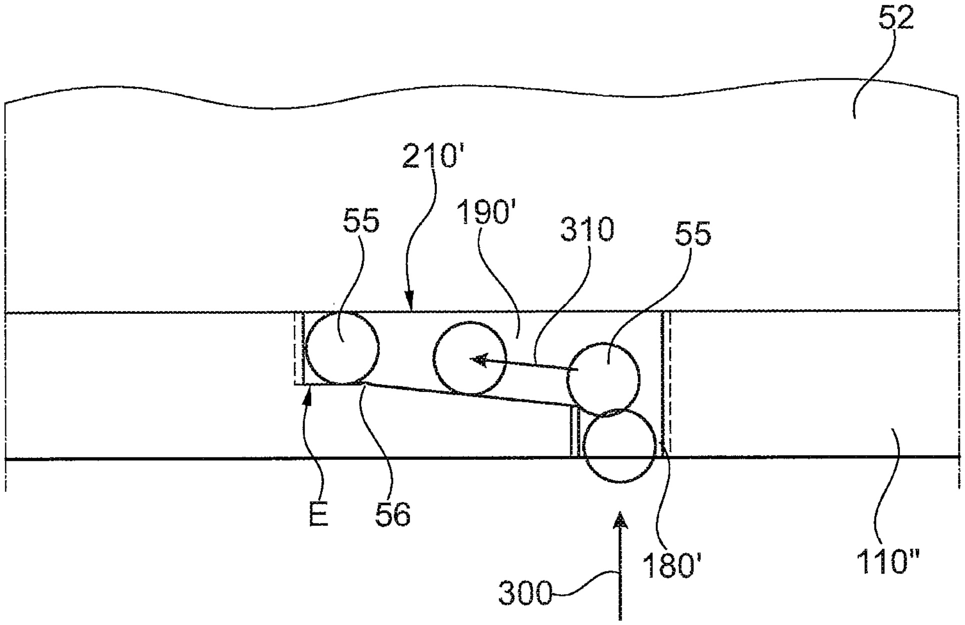
Figure 11:
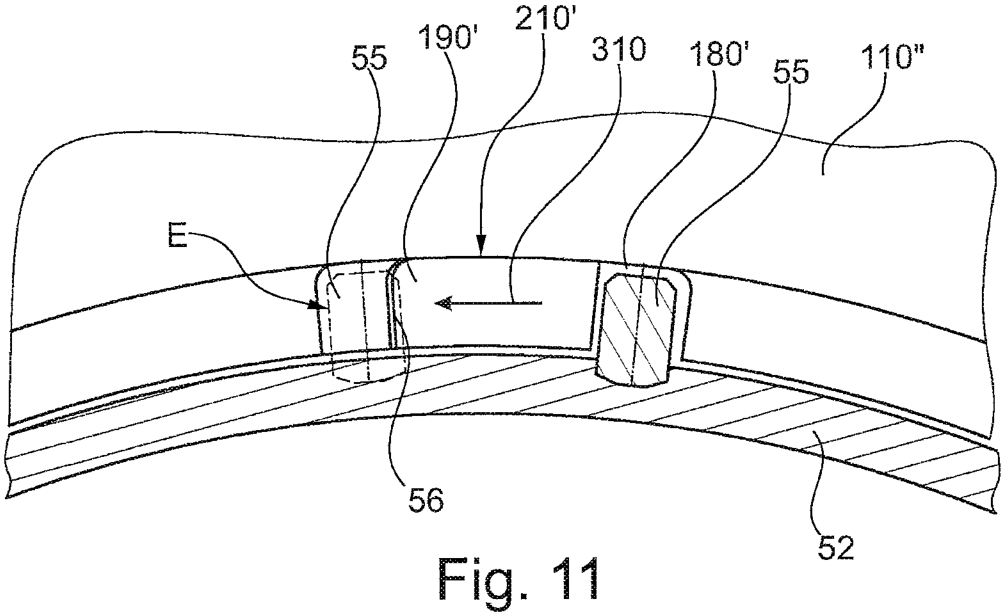

In the drawings:

FIG. 1 a potential embodiment of a precipitation tube bundle for a wet electrostatic filter, in a perspective view, FIG. 2 a bottom view of a support structure of the precipitation tube bundle according to FIG. 1, FIG. 3 a potential embodiment of a support structure for the precipitation tube bundle according to FIG. 1, shown as a detail having a plurality of components connected to each other, in a perspective view, FIG. 4 the support structure according to FIG. 3 and a detail of a precipitation tube supported therein, in a perspective view, FIG. 5 the arrangement according to FIG. 4 in a magnified view in the region of the precipitation tube, FIG. 6 a potential embodiment of a precipitation tube for a precipitation tube bundle according to FIG. 1, as a modular design, in a cross section view, FIG. 7 the precipitation tube according to FIG. 6 in a magnified section view in the region of the connection of two wall parts of the precipitation tube adjacent to each other, FIG. 8 a further potential embodiment of a precipitation tube for a precipitation tube bundle according to FIG. 1, shown as a section in the region of the connection of two wall parts of the precipitation tube adjacent to each other, FIG. 9 a further potential embodiment of a precipitation tube bundle for a wet electrostatic filter, as a detail of a support structure in the region of a precipitation tube received therein, in a section view, FIG. 10 the region A of the precipitation tube bundle according to FIG. 9, having a bayonet joint between the support structure and the precipitation tube, in a magnified section view, and FIG. 11 the region A of the precipitation tube bundle according to FIG. 9, having a bayonet joint between the support structure and the precipitation tube, in another magnified section view.

FIG. 1 shows a schematic representation of a potential embodiment of a precipitation tube bundle 100 for a wet electrostatic filter. The precipitation tube bundle 100 comprises a plurality of precipitation tubes, of which one is labeled with the reference numeral 1 as an example. In the installed state of the precipitation tube bundle 100 on the wet electrostatic filter, the exhaust gas or exhaust air or process gas to be cleaned flows through the precipitation tube 1, and due to a generated electrical field, precipitating of gaseous and/or liquid particles occurs at the inner walls thereof.

The precipitation tube bundle 100 is suitable for installing in a horizontal orientation or vertical orientation. In order to hold together the precipitation tubes 1 as a unit, the precipitation tube bundle 100 comprises a support structure 110 by means of which the precipitation tubes 1 are collated as a bundle, and said structure performs a support function for the precipitation tubes 1. The support structure 110 preferably forms a cuff with respect to the precipitation tubes 1.

The support structure 110 can be implemented so as to be supported in a wet electrostatic filter in a vertical arrangement on a housing (not shown in FIG. 1) of the wet electrostatic filter, so that the precipitation tubes 1 then have a vertical orientation. The support structure 110 is therefore preferably disposed in the region of the top end of the precipitation tube 1.

In addition, the precipitation tube bundle 100 can comprise at least one guide part 120, particularly a guide ring, serving for spacing apart the precipitation tubes 1 from each other. The guide part 120 is disposed, for example, in the region of the other end of the precipitation tube 1. In addition, a further guide part 130, particularly a guide ring, can be provided, for example disposed between the support structure 110 and the guide part 120 and serving as a further component for spacing apart the precipitation tubes 1 from each other.

FIG. 2 shows a bottom view of the support structure 110 and the precipitation tubes 1 connected thereto. The support structure 110 comprises a plurality of pass-through opening, of which one pass-through opening is labeled with the reference numeral 140 as an example. The precipitation tubes 1 are inserted into the pass-through openings 140, wherein one of the precipitation tubes 1 is inserted into the corresponding pass-through opening 140.

The pass-through openings 140 are polygonal in design, for example, so that altogether a honeycomb structure results from the mutually adjacent pass-through openings 140. In the same or similar manner, the guide part 120 and/or the guide part 130 can have such pass-through openings, altogether forming a honeycomb structure, for example.

The support structure 110 further comprises a protrusion 150 protruding outward, preferably a circumferential protrusion 150, on which the support structure 110 can be supported in a housing (not shown in FIG. 1). The protrusion 150 can be formed by an edge region of a plate-shaped support element of the support structure 110.

The precipitation tube bundle 100 is implemented as a modular tube bundle system and thus the precipitation tube bundle 100 is to be erected using the modular principle. To this end, the precipitation tubes 1 are removably held on the support structure 110.

If the precipitation tube bundle 100 comprises at least one of the two guide parts 120 and 130, then the guide parts 120 and 130 are preferably also removably connected to the precipitation tubes 1. The precipitation tubes 1 can thereby be transported loose and separately from the support structure 110 as a module of the tube bundle system to the installation location of the wet electrostatic filter. The support structure 110 and the guide parts 120 and 130 form further modules of the precipitation tube bundle 100 implemented as a tube bundle system. The removable connection of the support structure 110 to the precipitation tube 1, the removable connection between the guide part 120 and the precipitation tube 1, and the removable connection between the guide part 130 and the precipitation tubes 1 is preferably implemented by connecting means (not shown in FIGS. 1 and 2), preferably implemented as form-fit means.

FIGS. 3, 4, and 5 show a potential embodiment of a support structure 110' for use as a support structure, for example, for the precipitation tube bundle 100 according to FIG. 1. Only a segment of the support structure 110 is shown as an example in FIGS. 3, 4, and 5, in order to explain the construction of the support structure 110'.

In the present embodiment, the support structure 110' itself is modular in design and comprises a plurality of parts 160, of which at least two, preferably at least three parts 160.1, 160.2, 160.3 form a periphery segment of at least one of the pass-through openings 140, so that the inner circumference of the pass-through opening 140.1 is formed by the parts 160.1, 160.2, 160.3 in the assembled state.

The parts 160 are preferably connected to each other by means of welding, riveting, and/or gluing. In the embodiment example of the support structure 110' according to FIGS. 3, 4, and 5, the parts 160 are connected to each other by means of spot welding, as can be seen by the spot welds 170.

Alternatively, the parts 160 can also be removably mutually connected, for example by means of form-fit means and/or force-fit means. For example, screw elements can be provided, by means of which adjacent parts 160 are screwed to each other.

FIG. 4 shows a segment of the support structure 110' according to FIG. 3 using a plurality of assembled parts 160, wherein one precipitation tube 1' is removably received in the pass-through opening 140.1 as an example. FIG. 5 shows examples of connecting means 200 by means of which the precipitation tube 1' is removably retained on the support structure 110'.

As can be seen in FIG. 5, the connecting means 200 can be formed by a bayonet joint 210. The bayonet joint 210 is formed, for example, by a joint groove 180 or joint channel extending in the axial direction with respect to the pass-through opening or insertion receptacle, and by a latching groove 190 or latching channel extending transverse thereto, both implemented on the support structure 110, particularly on at least one of the parts 160. The bayonet joint 210 further comprises at least one protrusion 17 implemented on the precipitation tube 1', for example formed thereon.

For assembling the precipitation tube 1' to the support structure 110', one end of the precipitation tube 1' is inserted into the pass-through opening 140.1, wherein the protrusion 17 of the precipitation tube 1' is introduced into the joint groove 180 when inserting the precipitation tube 1'. The precipitation tube 1' is then inserted into the pass-through opening 140.1 far enough for the protrusion 17 to reach the inlet region of the latching groove 190. By rotating the precipitation tube 1' relative to the support structure 110', the protrusion 17 is inserted into the latching groove 190 and from there is brought into the end position thereof in the latching groove 190. The precipitation tube 1' is thereby secured against pulling out of the pass-through opening 140.1 and the precipitation tube 1 is thus secured and attached to the support structure 110'.

FIG. 6 shows a potential embodiment of a precipitation tube 1" for a precipitation tube bundle of a wet electrostatic filter, for example for use in the precipitation tube bundle 100 according to FIG. 1. The precipitation tube 1" according to FIG. 6 can also be used in an assembly having the support structure 110' according to FIGS. 3 through 5 and thus comprise a part of the connecting means 200 provided there, particularly the protrusion 17 of the bayonet joint 210.

The precipitation tube 1" according to FIG. 6 is itself modular in construction and comprises at least two, preferably at least three wall parts 2, 3, and 18, each forming a periphery segment 4, 5, and 19 of the inner circumference 6 of the precipitation tube 1" and able to be connected to each other for forming at least one part of the inner circumference 6 of the precipitation tube 1". The precipitation tube 1" is preferably divided longitudinally by the wall parts 2, 3, and 18. In the representation according to FIG. 6, the wall parts 2, 3, and 18 are assembled together and the precipitation tube 1" is thereby formed.

The precipitation tube 1" comprises connecting means 7 by means of which the adjacent wall parts 2, 3 or 3, 18 or 18, 2 are connected to each other, particularly removably connected, for example connected to each other by force-fit and/or form-fit means.

FIG. 7 shows a potential embodiment of the connecting means 7 using the example of the wall parts 2 and 3 adjacent to each other. As can be seen therefrom, the connecting means 7 are formed by a tongue-and-groove arrangement 8, for example implemented along opposite end regions or free edges 11 and 12 of the wall parts 2 and 3.

For example, a tongue element 9 of the tongue-and-groove arrangement 8 can be implemented at one end in the circumferential direction of the wall part 2, particularly formed thereon, and a groove element 10 corresponding thereto can be implemented on the opposite circumferential end of the wall part 3, particularly formed thereon. When the tongue element 9 is then brought into engagement with the groove element 10, form-fit connection acting in the radial direction relative to the precipitation tube 1" is achieved.

In order to prevent releasing the wall parts 2 and 3 from each other, additional retainers 13 are preferably provided (FIG. 6). The retainers 13 preferably comprise a material segment 14 implemented on, preferably formed on, one of the adjacent wall parts 2 and 3, for example the wall part 3. The material segment 14 extends past the other of the adjacent wall parts 2 and 3, for example the wall part 2, on the circumferential side along one end, and a latching protrusion 15 thereof engages in a recess 16 implemented on the outer circumference of the other wall part 2. When the latching protrusion 15 is latchingly engaged in the recess 16, the tongue-and-groove arrangement 8 is secured against releasing in the radial direction.

The tongue element 9 and the groove element 10 preferably extend continuously in the longitudinal direction of the precipitation tube 1". The retainers 13 preferably extend continuously in the longitudinal direction of the precipitation tube 1". For example, the tongue element 9 and the groove element 10 are each implemented as a profile extending in the longitudinal direction of the precipitation tube 1". For example, the material segment 14 and the latching protrusion 15 are at least partially implemented as a corresponding profile in the longitudinal direction of the precipitation tube 1", wherein the recess 16 is preferably continuously profiled in the circumferential extent of the associated wall part 2 in the longitudinal direction of the precipitation tube 1".

FIG. 8 shows a further potential embodiment of a precipitation tube 1" for a precipitation tube bundle of a wet electrostatic filter, for example for use in the precipitation tube bundle 100 according to FIG. 1. The precipitation tube 1" according to FIG. 8 can also be used in an assembly having the support structure 110' according to FIGS. 3 through 5 and thus comprise a part of the connecting means 200 provided there, particularly the protrusion 17 of the bayonet joint 210. The precipitation tube 1'" is shown in cross section in FIG. 8 in the region of the connection of two adjacent wall parts 2'" and 3'".

The precipitation tube 1'" differs from the precipitation tube 1" according to FIGS. 6 and 7 in part in that a separate connecting element 20 is provided, by means of which the wall parts 2'" and 3'" can be connected to each other on the circumferences thereof by interposing said element. FIG. 8 shows the wall parts 2'" and 3'" connected by means of the separate connecting element 20.

The connecting element 20 can extend continuously in the axial direction of the precipitation tube 1'", for example implemented as a profile extending in the axial direction. The connecting element 20 can be implemented so as to implement a tongue-and-groove connection with the wall part 2'" and also implement a tongue-and-groove connection with the wall part 3'".

The connecting element 20 can comprise a receptacle for a circumferential end of the wall part 2'" and a further receptacle for a circumferential end of the wall part 3'" to this end, said receptacles each being implemented as a groove element 10.1 or 10.2. The receptacles or groove elements 10.1 and 10.2 can be mirror-symmetrical to each other with respect to a center axis 21, so that the openings of the receptacles are disposed opposite each other. The wall parts 2''' and 3''' each comprise a corresponding tongue element 9 at the end region thereof, said element being inserted in the corresponding groove element 10.1 or 10.2.

The connecting element 20 preferably comprises retainers by means of which the wall parts 2''' and 3''' to be connected to each other are secured against undesired release form each other. To this end, the connecting element 20 comprises a material segment 14.1 overlapping the wall part 2''' in the circumferential direction along one end and able to engage or engaged by latching a latching protrusion 15.1 into a recess 16.1 on the outer circumference of the wall part 2'''. The retainers preferably additional comprise a material segment 14.2 overlapping the wall part 3''' in the circumferential direction along one end and able to engage or engaged by latching a latching protrusion 15.2 into an associated recess 16.2 on the outer circumference of the wall part 3'''.

As can be seen in FIG. 8, the cross section of the connecting element 20 can be constructed uniformly, particularly mirror-symmetrically, relative to the center axis 21. The corresponding tongue elements 9 on both the wall part 2''' and the wall part 3''' can thereby be implemented identically to each other. The wall parts 2''' and 3''' of the precipitation tube 1 can thereby be implemented as parts identical to each other.

FIG. 9 shows a further potential embodiment of a precipitation tube bundle 100' for a wet electrostatic filter implemented as a modular tube bundle system. The precipitation tube bundle 100' comprises a plurality of precipitation tubes and a support structure 110" collating the precipitation tubes as a bundle, on which the precipitation tube are removably held. FIG. 9 shows of a segment of the support structure 110' in the region of one of the precipitation tubes in a section view through the cross section of a precipitation tube 50 and through the support structure 110".

The precipitation tube 50 can be modular in construction and be made of a plurality of, for example three, wall parts 51, 52, and 53, each forming a periphery segment of the inner circumference 6 of the precipitation tube 50 and connected to each other for forming part of the inner circumference 6 of the precipitation tube 50. The connecting means 7 described for FIGS. 1 through 5 can be used to this end.

The pass-through opening of the support structure 110" forms an insertion receptacle into which the precipitation tube 50 is inserted. By means of a bayonet joint 210', the precipitation tube 50 is positively retained on the support structure 110" in the axial direction relative to the longitudinal axis 54, particularly the center axis, of the precipitation tube 50. The bayonet joint 210' and the pass-through opening in the support structure 110", the dimensions of which preferably correspond to the outer dimensions of the precipitation tube 50, thus form the attachment of the precipitation tube 50 to the support structure 110".

The bayonet joint 210' is preferably present at least as one, preferably as three thereof, wherein each wall part 51 or 52 or 53 is associated with one of the bayonet joints 210', for example. A stable and durable attachment of the precipitation tube 50 to the support structure 110" in the axial direction is thereby achieved. Each bayonet joint 210' is preferably disposed outside of the corresponding connecting means 7.

The construction of the bayonet joint 210' is shown as an example in FIGS. 10 and 11. FIGS. 10 and 11 show the region A of FIG. 9 in a magnified view, wherein FIG. 10 shows the region A in a section view along the section line B-B of FIG. 9 and FIG. 11 shows the region A in a cross section view according to FIG. 9.

The support structure 110" comprises a joint groove 180' or a joint channel in the region of the edge of the pass-through opening for the precipitation tube 50, said groove extending in the longitudinal direction thereof substantially in the insertion direction of the precipitation tube 50 into the pass-through opening of the support structure 110". For example, the longitudinal direction of the joint groove 180' or the joint channel extends in the axial direction relative to the precipitation tube 50. The joint groove 180' or the joint channel opens into a latching groove 190' or a latching channel extending transverse to the joint groove 180' or joint channel. The joint groove 180' or the joint channel and the latching groove 190' or latching channel form the part of the bayonet joint 210' associated with the support structure 110". The part of the bayonet joint 210' associated with the precipitation tube 50 is formed by a protrusion 55 formed on or connected to the precipitation tube 50. The protrusion 55 can be implemented as a catch, a bump, or similar latching element, for example having a cylindrical cross section.

The bayonet joint 210' is produced in the same manner as previously described for the bayonet joint 210 according to FIG. 5. The precipitation tube 50 is inserted into the pass-through opening of the support structure 210' in the direction of the arrow 300 and the protrusion 55 is thereby inserted into the joint groove 180'. By rotating the precipitation tube 50 relative to the support structure 100" in the direction of the arrow 310, the protrusion 55 enters the latching groove 190' from the joint groove 180', by means of which the form-fit connection in the axial direction, and thereby the bayonet joint 210', is implemented.

For example, an end region of the latching groove 190' or the latching channel forms an end position E for the protrusion 55. In FIG. 10, the protrusion 55 is shown in different positions as examples in the joint groove 180' and in the latching groove 190', in order to demonstrate the progress of the protrusion 55 when establishing the bayonet joint 210'. FIG. 11 shows the protrusion 55 first inserted into the joint groove 180' and as an example in the end position E in the latching groove 190', when the bayonet joint 210' is established.

The latching groove 190' or the latching channel can taper in the longitudinal direction at least until the region of the longitudinal segment by which the end position E is formed, as can be seen in FIG. 10. In addition, the latching groove 190' or the latching channel can comprise a catch 56 on at least one side wall or on opposing side walls, in order to retain the protrusion 55 in the end position E. The catch 56 can be formed by a bulge or bump on the side wall or both side walls. The bulge 56 can comprise a linear extent. The bulge 56 can additionally or alternatively be implemented as a point.

REFERENCE LIST

1 Precipitation tube
1' Precipitation tube
1" Precipitation tube
1''' Precipitation tube
2 Wall part
2''' Wall part
3 Wall part
3''' Wall part
4 Periphery segment
5 Periphery segment
6 Inner circumference

7 Connecting means
8 Tongue-and-groove arrangement
9 Tongue element
10 Groove element
10.1 Groove element
10.2 Groove element
11 Edge
12 Edge
13 Retainer
14 Material segment
14.1 Material segment
14.2 Material segment
15 Latch protrusion
15.1 Latch protrusion
15.2 Latch protrusion
16 Recess
16.1 Recess
16.2 Recess
17 Protrusion
18 Wall part
19 Periphery segment
20 Separate connecting element
21 Center axis
50 Precipitation tube
51 Wall part
52 Wall part
53 Wall part
54 Longitudinal axis
55 Protrusion
56 Catch
100 Precipitation tube bundle
100' Precipitation tube bundle
110 Support structure
110' Support structure
110" Support structure
120 Guide part
130 Guide part
140 Pass-through opening
140.1 Pass-through opening
150 Protrusion
160 Part
160.1 Part
160.2 Part
160.3 Part
170 Weld spot
180 Joint groove
180' Joint groove
190 Latching groove
190' Latching groove
200 Connector
210 Bayonet joint
210' Bayonet joint
300 Arrow
310 Arrow
E End position

The invention claimed is:

1. A precipitation tube bundle for a wet electrostatic filter, in particular for the separation of any one or combination of dusts, gases, and aerosols from exhaust gases, comprising:

a plurality of precipitation tubes; and a support structure which supports the precipitation tubes and combines them in a bundle and which has at least one insertion recess into which at least one of the precipitation tubes is introduced, wherein the precipitation tube bundle is a modular tube bundle system in which the precipitation tubes are detachably held on the support structure by fastening mechanisms, and wherein the fastening mechanisms are engaged by rotating the precipitation tubes relative to the support structure, wherein the fastening mechanisms comprise at least one connection element and at least one counter element, wherein the at least one connection element is molded or pre-fitted on the at least one of the precipitation tubes, and wherein the at least one counter element is molded or pre-fitted on the support structure.

2. A precipitation tube bundle for a wet electrostatic filter, in particular for the separation of any one or combination of dusts, gases, and aerosols from exhaust gases, comprising:

a plurality of precipitation tubes; and a support structure which supports the precipitation tubes and combines them in a bundle and which has at least one insertion recess into which at least one of the precipitation tubes is introduced, wherein the precipitation tube bundle is a modular tube bundle system in which the precipitation tubes are detachably held on the support structure by fastening mechanisms, and wherein the fastening mechanisms are engaged by rotating the precipitation tubes relative to the support structure, and wherein the fastening mechanisms comprise or form a bayonet closure formed by or comprising a joint groove or joint channel extending in a direction of introduction of the precipitation tubes and a detent groove or detent channel, extending transversely with respect thereto, on the support structure and a protrusion, introduced therein, of the at least one of the precipitation tubes.

3. The precipitation tube bundle according to claim 2, wherein the detent groove or the detent channel has a length portion which forms an end position for the protrusion, wherein the detent groove or the detent channel narrows in cross section towards the length portion.

4. A precipitation tube bundle for a wet electrostatic filter, in particular for the separation of any one or combination of dusts, gases, and aerosols from exhaust gases, comprising:

a plurality of precipitation tubes; and a support structure which supports the precipitation tubes and combines them in a bundle and which has at least one insertion recess into which at least one of the precipitation tubes is introduced, wherein the precipitation tube bundle is a modular tube bundle system in which the precipitation tubes are detachably held on the support structure by fastening mechanisms, and wherein the fastening mechanisms are engaged by rotating the precipitation tubes relative to the support structure, wherein at least some of the precipitation tubes are plastic tubes, each comprising at least two plastic wall parts forming circumferential portions of a respective of the at least some precipitation tubes, the at least two plastic wall parts being interconnected by connection means, and wherein the connection means comprise at least one or more tongue-and-groove arrangements, brought into engagement with one another along mutually opposite edges of the at least two plastic wall parts, and securing means by way of which the at least two plastic wall parts are secured against unwanted detachment from one another at least in one direction.

5. The precipitation tube bundle according to claim 4, wherein the connection means are molded on the at least two plastic wall parts.

6. The precipitation tube bundle according to claim 4, wherein the at least two plastic wall parts are detachably interconnected in a force-fitting manner by way of the connection means.

7. The precipitation tube bundle according to claim 4, wherein the connection means are form-fitting means which hold together the at least two plastic wall parts in a form fitting manner in a radial direction of the at least some of the precipitation tubes.

8. The precipitation tube bundle according to claim 4, wherein the securing means comprise, on one of the at least two plastic wall parts, a material portion which engages over another of at least two plastic wall parts in a circumferential direction and which includes a detent projection which engages in a depression on an outer circumference of the another of the at least two plastic wall parts.

9. The precipitation tube bundle according to claim 4, wherein the at least two plastic wall parts are at least three plastic wall parts.

10. A method for producing a precipitation tube bundle for a wet electrostatic filter, in particular for the separation of any one or combination of dusts, gases, and aerosols from exhaust gases, the precipitation tube bundle having a plurality of precipitation tubes; and a support structure which supports the precipitation tubes and combines them in a bundle and which has at least one insertion recess into which at least one of the precipitation tubes is introduced, wherein the precipitation tube bundle is a modular tube bundle system in which the precipitation tubes are detachably held on the support structure by fastening mechanisms, and wherein the fastening mechanisms are engaged by rotating the precipitation tubes relative to the support structure, the method comprising:

transporting the precipitation tubes and the support structure to a destination; and assembling the precipitation tubes and the support structure at the destination with the fastening mechanisms wherein the destination is a construction location for a construction of the wet electrostatic filter.

11. A method for producing the precipitation tube bundle according to claim 4, comprising:

transporting the precipitation tubes and the support structure to a designated destination;

assembling the at least some of the precipitation tubes by connecting the at least two plastic wall parts by means of the connection means and the securing means; and assembling the precipitation tubes and the support structure with the fastening mechanisms.

12. A wet electrostatic filter having a precipitation tube bundle for the separation of any one or combination of dusts, gases, and aerosols from exhaust gases, comprising:

a plurality of precipitation tubes; and a support structure which supports the precipitation tubes and combines them in a bundle and which has at least one insertion recess into which at least one of the precipitation tubes is introduced, wherein the precipitation tube bundle is a modular tube bundle system in which the precipitation tubes are detachably held on the support structure by fastening mechanisms, and wherein the fastening mechanisms are engaged by rotating the precipitation tubes relative to the support structure.

* * * * *